United States Patent [19]
Rodgers et al.

[11] Patent Number: 5,668,692
[45] Date of Patent: Sep. 16, 1997

[54] SELF-POWERED CIRCUIT INTERRUPTION ARRANGEMENT

[75] Inventors: Barry Noel Rodgers; Timothy Brian Phillips, both of Raleigh, N.C.

[73] Assignee: Square D Company, Palatine, Ill.

[21] Appl. No.: 143,948

[22] Filed: Oct. 27, 1993

[51] Int. Cl.[6] .................. H02H 3/18; H02H 9/02
[52] U.S. Cl. .................. 361/93; 361/85; 361/86; 361/102; 323/276; 323/285
[58] Field of Search .................. 361/93, 95, 85–87, 361/63, 76, 94, 92, 96–97, 101–102; 323/273–278, 284–285

[56] References Cited

U.S. PATENT DOCUMENTS

| | | | |
|---|---|---|---|
| 3,582,982 | 6/1971 | Swinhart et al. | 317/22 |
| 3,660,718 | 5/1972 | Pinckaers | 317/13 |
| 3,683,237 | 8/1972 | Walstad et al. | 317/13 |
| 3,808,503 | 4/1974 | Hentschel | 317/13 |
| 3,875,464 | 4/1975 | Gary et al. | 317/13 |
| 3,988,641 | 10/1976 | Hentschel | 317/13 |
| 3,996,480 | 12/1976 | Hentschel | 307/235 |
| 4,025,883 | 5/1977 | Slade et al. | 335/16 |
| 4,048,663 | 9/1977 | Lemke | 361/75 |
| 4,509,088 | 4/1985 | Profio | 361/29 |
| 4,597,025 | 6/1986 | Rutchik et al. | 361/94 |
| 4,731,692 | 3/1988 | Dvorak et al. | 361/102 |
| 4,823,226 | 4/1989 | Reed et al. | 361/85 |
| 4,833,625 | 5/1989 | Fisher et al. | 364/518 |
| 4,879,626 | 11/1989 | Kim et al. | 361/93 |
| 4,897,756 | 1/1990 | Zylstra | 361/44 |
| 4,992,723 | 2/1991 | Zylstra et al. | 323/284 |
| 5,016,135 | 5/1991 | Zylstra | 361/156 |
| 5,038,246 | 8/1991 | Durivage, III | 361/93 |
| 5,179,495 | 1/1993 | Zuzuly | 361/94 |
| 5,204,594 | 4/1993 | Carobolante | 318/254 |

FOREIGN PATENT DOCUMENTS

| | | |
|---|---|---|
| 0469207A2 | 2/1992 | European Pat. Off. . |
| 0477959A2 | 4/1992 | European Pat. Off. . |

Primary Examiner—Jeffrey A. Gaffin
Assistant Examiner—Michael J. Sherry
Attorney, Agent, or Firm—Larry I. Golden; David R. Stacey; Larry T. Shrout

[57] ABSTRACT

A circuit interrupter arrangement for interrupting current in a circuit path includes a hysteresis control circuit arranged to control a power supply charge-accumulation switch and an undervoltage trip-lockout circuit in parallel. More specifically, the arrangement includes a current inducer circuit for inducing a current signal having a magnitude corresponding to the current in the circuit path; an energy accumulator for accumulating a magnitude of energy to cause an interruption of the circuit path; an energy accumulator control circuit controlling the magnitude of energy accumulating; a trip lock-out circuit, responsive to an insufficient magnitude of accumulated energy, for preventing an interruption of the circuit path; and a range control circuit, responsive to the current inducer circuit, for operating a power-related signal between a first level and a second level to control the energy accumulator control circuit and the trip lock-out circuit.

21 Claims, 5 Drawing Sheets

SELF-POWERED CIRCUIT INTERRUPTION ARRANGEMENT

FIELD OF THE INVENTION

The present invention relates generally to circuit interruption arrangements and, more particularly, to tripping arrangements, such as circuit breakers and overload relays, which are powered from the circuit path they are arranged to interrupt (self-powered).

BACKGROUND OF THE INVENTION

The use of circuit breakers is widespread in modern-day residential, commercial and industrial electric systems, and they constitute an indispensable component of such systems toward providing protection against over-current conditions. Various circuit breaker mechanisms have evolved and have been perfected over time on the basis of application-specific factors such as current capacity, response time, and the type of reset (manual or remote) function desired of the breaker.

One type of circuit breaker mechanism employs a thermo-magnetic tripping device to "trip" a latch in response to a specific range of over-current conditions. The tripping action is caused by a significant deflection in a bi-metal or thermostat-metal element which responds to changes in temperature due to resistance heating caused by flow of the circuit's electric current through the element. The thermostat metal element is typically in the form of a blade and operates in conjunction with a latch so that blade deflection releases the latch after a time delay corresponding to a predetermined over-current threshold in order to "break" the current circuit associated therewith.

Another type of circuit interruption arrangement, useful for interrupting circuits having higher current-carrying capacities, uses current transformers to induce a current corresponding to the current in the circuit path, and an electronic circuit monitoring this induced current to detect power faults in the circuit path. In response to a power fault being detected, the electronic circuit generates a control signal which actuates a solenoid (or equivalent device) to cause the circuit-interrupting contacts to separate and interrupt the circuit path.

Causing the circuit-interrupting contacts to separate, however, can be a problem. For instance, it requires a significant accumulation of energy which is typically scarce in such arrangements which are self-powered, and an unsuccessful attempt to interrupt the circuit path depletes the reservoir of accumulated energy. This problem has been addressed by using an undervoltage circuit which ensures that a trip is not initiated until the power supply has sufficient energy, and a power supply regulation circuit which keeps the voltage applied to the electronic circuit within predetermined limits.

There are certain disadvantages to known circuit arrangements addressing these problems. For example, including both an undervoltage circuit and a power supply regulation circuit requires a significant number of components for proper control of the respective functions provided. Moreover, with two separate circuits, the maximum undervoltage level must be below the minimum regulated power supply level. This situation forces the power supply levels to be larger, which requires larger current transformers to support the extra power supply burden. In accordance with the present invention, it has been determined that these undervoltage and supply-regulation functions can be combined to reduce the power supply levels and eliminate the tolerance of the undervoltage circuit. Also the size of the current transformers feeding the circuit can be reduced because of the decreased voltage burden on them.

Accordingly, there is a need for a circuit interruption arrangement without the aforementioned shortcomings.

SUMMARY OF THE INVENTION

The present invention provides a circuit interruption arrangement which combines the undervoltage and supply-regulation functions. By combining these functions, the number of components required for these functions is reduced and the tolerance on the power supply due to one of the circuits is eliminated. With two separate circuits, the maximum undervoltage level is below the minimum regulated power supply level. This situation forces the power supply levels to be larger, which causes the current transformers to become larger to support the extra power supply burden. The present invention provides for a reduction of the power supply levels because of the elimination of the tolerance of the undervoltage circuit.

The present invention also permits the size of the current transformers feeding the arrangement to be reduced because of the decreased voltage burden on them.

The present invention improves over previous technology by combining the undervoltage monitoring function with the power supply regulation function. The undervoltage function ensures that the proper amount of tripping energy is available to initiate a trip before allowing a trip to be initiated, and the regulation function shunts away excess power supply current from the current transformers when the power supply has enough energy for the tripping mechanism.

Another problem solved by the present invention is the reduction of error from the current transformers. When current is being shunted from the power supply, the voltage burden on the current transformers is greatly reduced, which in turn reduces the error of the current transformers. With current transformers designed such that they deliver much more current than the circuit needs, the shunting function remains sufficiently active to cause the average error of the current transformers to be significantly reduced.

In one implementation of the present invention, a circuit interruption arrangement includes a current inducer circuit for inducing a current signal having a magnitude corresponding to the current in the circuit path; an energy accumulator for accumulating a magnitude of energy to cause an interruption of the circuit path; an energy accumulator control circuit controlling the magnitude of energy accumulating; a trip lock-out circuit, responsive to an insufficient magnitude of accumulated energy, for preventing an interruption of the circuit path; and a range control circuit, responsive to the current inducer circuit, for operating a power-related signal between a first level and a second level to control the energy accumulator control circuit and the trip lock-out circuit.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
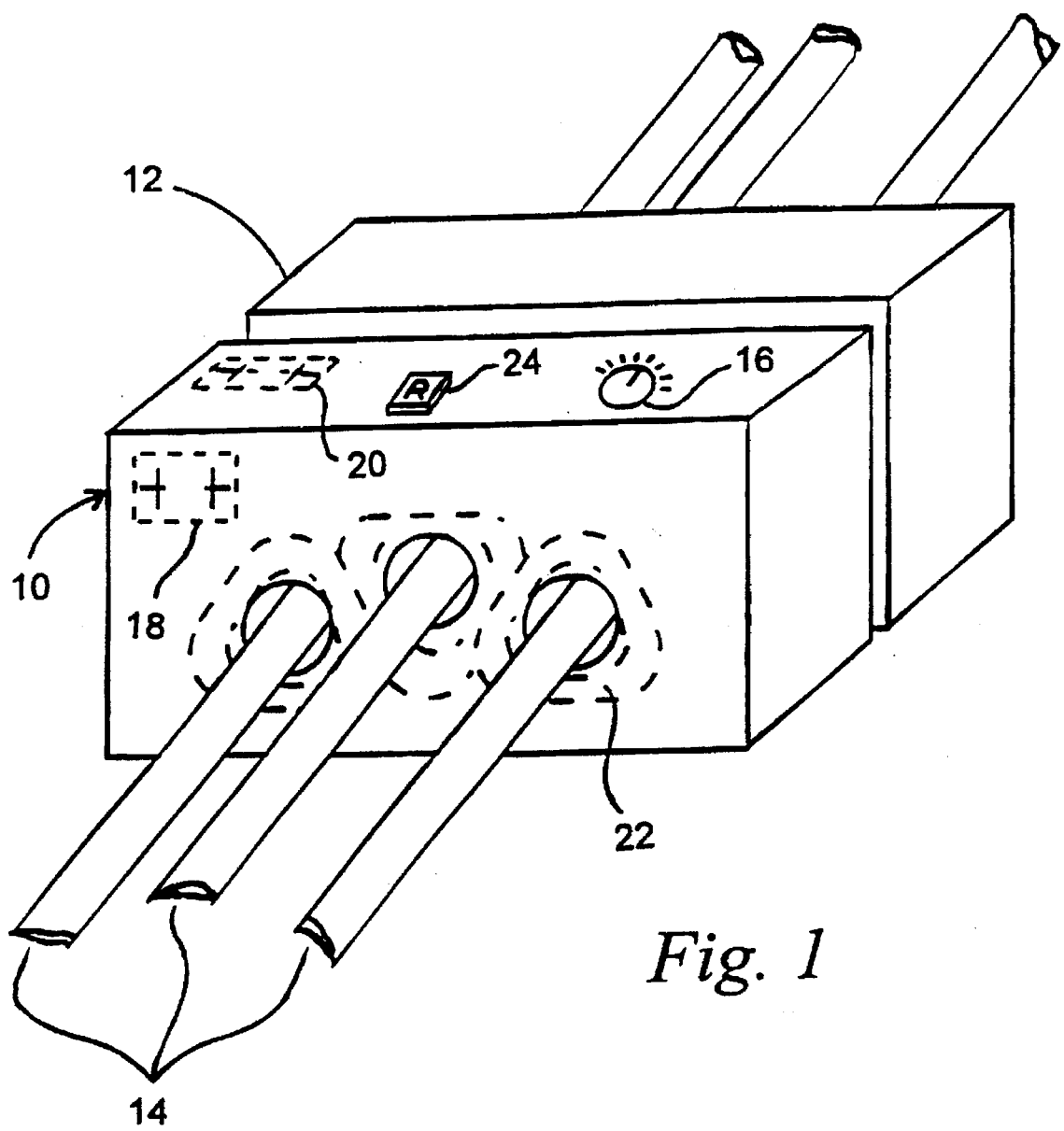
FIG. 1 is a perspective illustration of a circuit interruption system, in accordance with the present invention.

While the invention is susceptible to various modifications and alternative forms, specific embodiments thereof have been shown by way of example in the drawings and will be described in detail. It should be understood, however, that it is not intended to limit the invention to the particular form described. On the contrary, the intention is to cover all modifications, equivalents and alternatives falling within the spirit and scope of the invention as defined by the appended claims.

DETAILED DESCRIPTION OF THE FIGURES

The present invention may be used in a wide variety of residential, commercial and industrial applications. For the sake of brevity, however, the implementation of the present invention to be described and illustrated below in connection with FIGS. 1–4 is directed to high-performance applications requiring low cost and a small package.

Turning now to FIG. 1, a perspective illustration of a circuit interruption system as shown in the form of an overload relay 10 and a contactor unit 12, both having a common set of three-phase conductors 14 passing through apertures in their housings. The contactor unit 12 is conventional and can be implemented using, for example, Square D Class 8502, Type SA012.

The overload relay 10 includes a set of three individual current transformers (one for each phase) or a three phase current transformer 22 (shown in dotted lines) within the housing of the overload relay, and a manual reset button 24 for resetting the electronics and solenoid control and latch mechanism which commands the contactor unit 12 to interrupt the circuit path provided by the three phase conductors 14. Overload contacts 18 and auxiliary contacts 20 are provided for actuating the contactor unit 12 to interrupt the current path in the conductors 14 and for providing an alarm signal to indicate that the unit has tripped, respectively. A potentiometer dial 16 is included on the overload relay housing for the overload relay 10 to provide the user with the ability to change the set point for the current trip level within a predetermined range.

Figure 2:
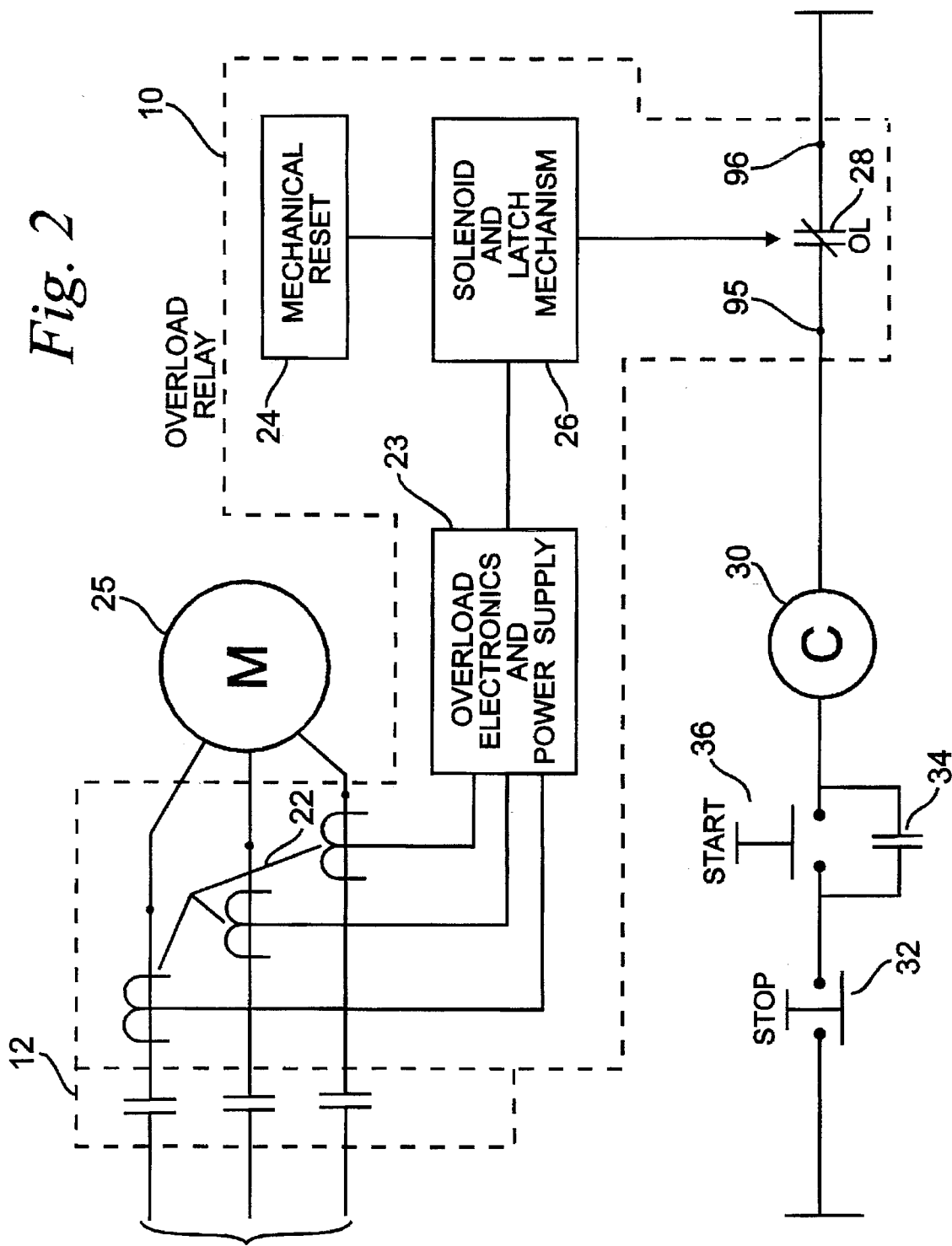
FIG. 2 is an electrical block diagram of the system of FIG. 1.

In FIG. 2, the overload relay 10 and the contactor unit 12 are shown from an electrical perspective providing current to a three-phase motor 25 and having three high-level functional blocks, an overload-electronics/power-supply 23, a mechanical reset 24, and a solenoid and latch mechanism 26. The overload-electronics/power-supply 23 analyzes the current passing to the motor 25 and engages the solenoid and latch mechanism 26 so that the overload contacts 28 (at terminals 95 and 96) can open to de-energize the coil 30 if a fault is present. The mechanical reset 24 is arranged to manually reset the solenoid and latch mechanism 26 after a trip has occurred. The stop switch 32 and the holding contacts 34 in parallel with the start switch 36 are conventionally implemented and arranged to provide control of the contactor coil 30 which controls power flow to the motor 25.

Figure 3:
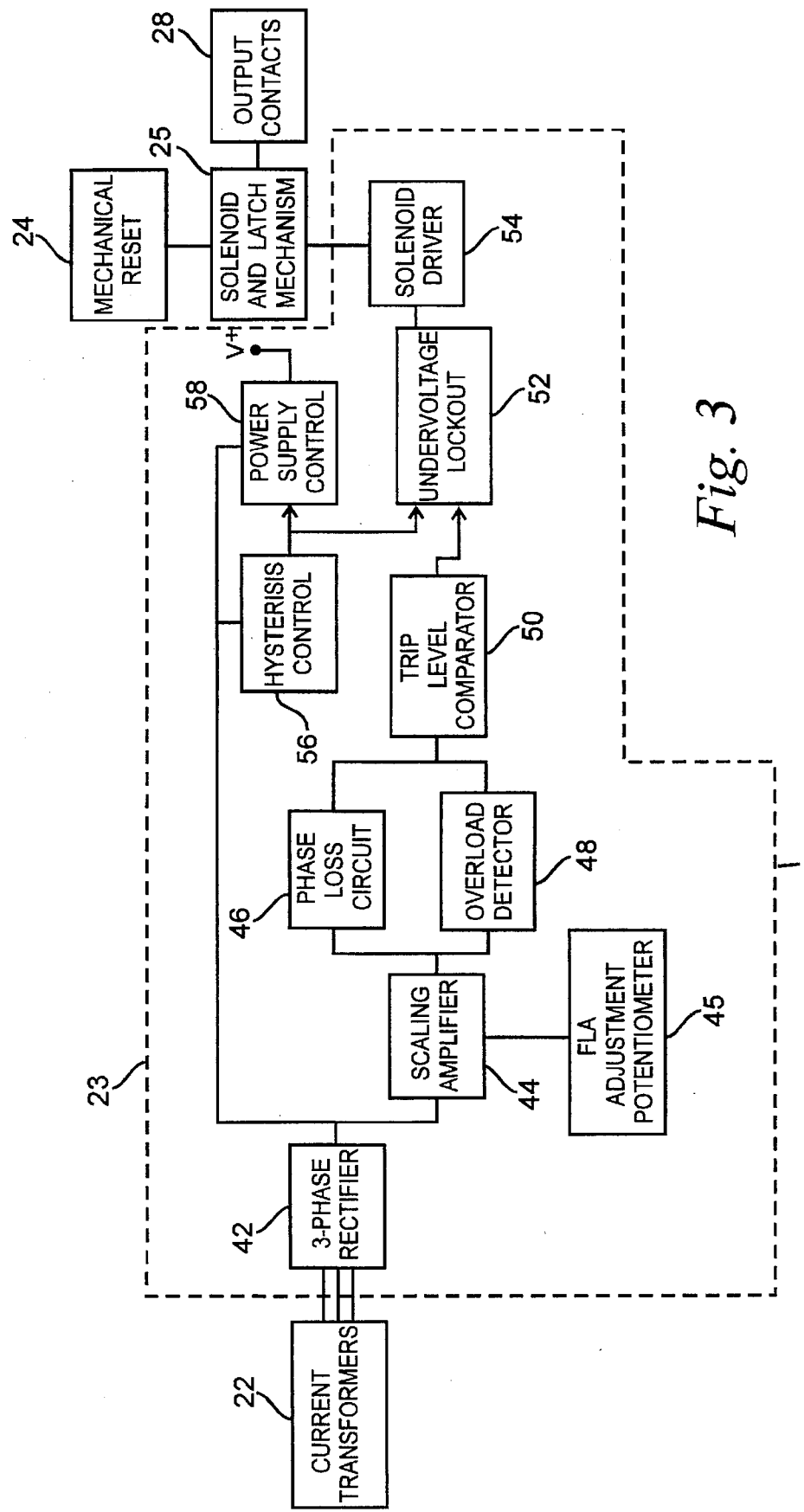
FIG. 3 is a block diagram of part of the circuit interruption system shown in FIG. 1.

Referring now to FIG. 3, the overload-electronics/power-supply 23 of FIG. 2 is shown in expanded form. A current signal having a magnitude proportional to the current from the three-phase lines is induced by current transformers 22 and the current signal is then rectified by a three-phase rectifier 42. The outputs of the three-phase rectifier 42 are scaled by a scaling amplifier 44 and, via the dial (16 of FIG. 1), the set point for the current trip level is adjusted using an FLA (Full Load Amperage) adjustment potentiometer 45. The overload relay is designed to trip at different currents, depending on the dial setting selected by the user. For example, the nominal trip rating is 112% FLA but is allowed to be between 100% and 125% for a 1.15 or greater service factor motor. The output of the scaling amplifier provides a per-unit value level adjustment, in that the voltage output is proportional to the current actually being measured by the system based on the dial setting. For example, when 112% of the full load current is flowing, the voltage output from the scaling amplifier is about 1.5 volts.

From the scaling amplifier 44, faults in the three-phase circuit path are detected using a phase loss circuit 46 and an overload detector 48. The phase loss detector 46 protects the motor from overheating when current in one of the phases is lost (i.e., interrupted or grossly unbalanced with respect to the other two phases). The overload detector 48 functions as an overload timer monitoring a three-phase current condition in which the motor is drawing an excessive amount of current for a predetermined period of time. The phase loss and overload conditions can occur separately or in conjunction with one another. A motor does not necessarily have to be drawing more than the normal current in order to overheat on a phase loss condition because the device only measures the current in the stator. In a phase loss condition, the current in the stator may not necessarily go above an overload condition but currents in the rotor that are difficult to measure will exceed the overload condition thereby causing the motor to overheat.

More specifically, the phase loss circuit 46 recognizes aberrations in the wave shape of the current being monitored. Under normal conditions, the voltage output from the scaling amplifier is primarily DC with about 10% ripple and the phase loss circuit 46 is inactive during those conditions. If a phase loss condition occurs, the voltage output from the scaling amplifier appears as a full-wave rectified AC signal having a wave shape which instantaneously falls to zero volts during each half cycle. The phase loss circuit recognizes such a condition and provides a trip request if that signal persists for more than two or three seconds.

It has also been discovered, according to this invention, that there is also a gross phase unbalance condition which can trigger the phase loss circuit 46. This condition occurs when one phase current is twice the magnitude of the other two phase currents (in the presence of no ground fault currents). If one current is equal to twice the magnitude of the other two, the three currents appear to the rectifier as a single-phase full-wave rectified current. This condition causes the phase loss circuit to request a trip.

With respect to the long time integrator function provided by the overload detector 48, the output of the detector is scaled such that if six times the motor nameplate reference or FLA adjustment current is flowing in the load then the overload detector responds to deliver a trip signal in less than 20 seconds for a class 20 overload and less than 10 seconds for a class 10 overload. If the level of current is correspondingly lower, then the overload timer will take a longer time to respond.

With reference to the stable reference voltage set relative to the power supply for the overload relay 10, a trip level comparator 50 monitors the outputs of the phase loss circuit 46 and the overload detector 48 for trip requests. When the trip level comparator determines that a phase loss or an overload has been detected, the trip level comparator 50 generates a command signal in the direction of the solenoid driver 54 to break the circuit in the contactor coil path, thereby causing the contactor to de-energize and break the circuit path in the conductors carrying the current to the motor.

The command signal provided from the trip level comparator 50 is not sent to the solenoid driver 54 directly. An undervoltage lockout circuit 52, located between the trip level comparator 50 and the solenoid driver 54, ensures that there is sufficient power to engage the solenoid. Using a hysteresis control circuit 56 and a power-supply/power-control circuit 58, the undervoltage lockout circuit 52 permits the trip command from the trip level comparator 50 to engage the solenoid driver 54 and break the circuit path in the three-phase conductors, as described, with minimal power requirements on the current transformers. The combined functions of the undervoltage lockout and supply regulation permit the current transformers to be selected for optimizing both operating power for the overload relay and the requisite level of accuracy for the analysis of the current in the three-phase conductors. For example, because the accuracy of the power fault analysis is directly proportional to the size and cost of most current transformers, either a conventional accuracy standard can be maintained using smaller and less expensive current transformers, or the typical accuracy standard can be significantly improved using conventionally sized and conventionally priced current transformers.

Figure 4:
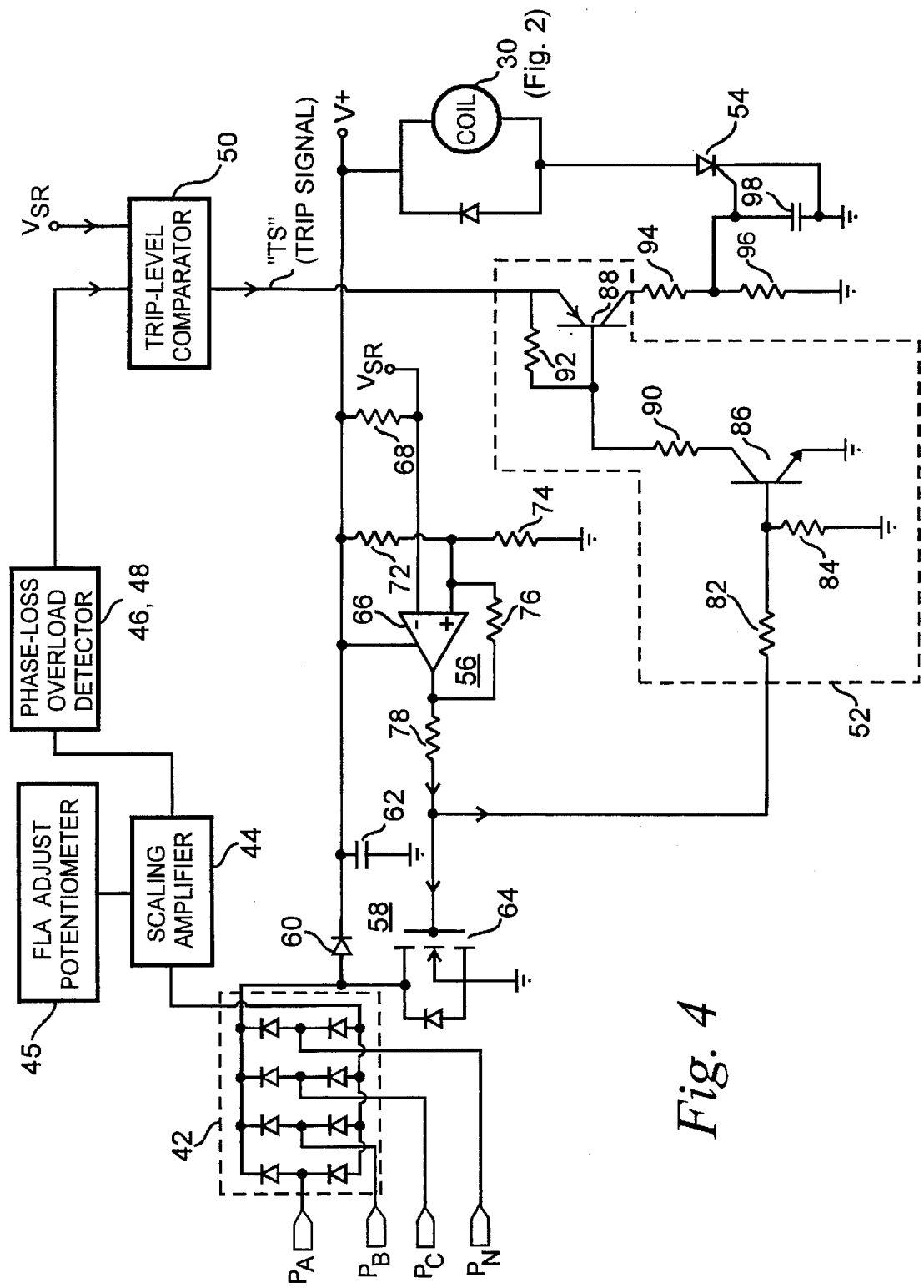
FIG. 4 is an exploded view of the block diagram of FIG. 3 including an electrical schematic diagram pertaining to power control within the system of system of FIG. 1.

FIG. 4 provides an exploded view of the three-phase rectifier 42, the hysteresis control 56, the undervoltage lockout circuit 52 and the power supply/power control circuit 58 of FIG. 3.

The positive outputs of each of four full wave rectifiers (one for each of the three phases and one for neutral) are interconnected to provide a current summation signal, denoted "+", and used by the electronics to develop a power supply, "V+", providing operating power to the electronics and sufficient power (or energy) to trip the solenoid coil 30. The current summation signal is fed through a blocking diode 60 to a capacitor 62 which maintains a charge ranging between a first power-related level and a second power-related level in response to the "ON" and "OFF" states of a power accumulation switch, FET 64. If the FET 64 is "OFF" the current summation signal charges capacitor 62 to the second power-related level. If the FET 64 is "ON", the current summation signal is shunted away from the blocking diode 60 and the capacitor 62, thereby preventing any further charging of the capacitor 62 and allowing it to discharge to the first power-related level.

The switched state of FET 64 is controlled by the output of the range control circuit which includes hysteresis control circuit 56, which includes operational amplifier 66.

A scaled down voltage of capacitor 62 is derived from resistors 72 and 74 and is applied to the positive input terminal of operational amplifier 66. A stable reference voltage (VSR) is developed at the interconnection of a resistor 68 and a bandgap reference 70 and is applied to the negative terminal of the operational amplifier 66. When the voltage applied to the positive terminal of operational amplifier 66 is greater than the voltage applied to the negative terminal, the output will swing "HIGH" thus driving the FET 64 into conduction. When this happens, an extra voltage is applied to the positive terminal of operational amplifier 66 through a resistor 76 connected between the output of the operational amplifier 66 and its positive input. This causes hysteresis in the sense that the scaled down voltage of capacitor 62 will have to be a predetermined amount smaller that the stable reference voltage VSR in order for operational amplifier 66 to switch to the "LOW" state thus enabling FET 64 to switch "OFF". The amount of hysteresis or the difference in voltage between the first and second power-related levels will be determined by the values of resistors 72, 74 and 76.

The operational amplifier 66 also controls the lockout circuit 52 such that the lockout circuit 52 enables the trip level comparator 50 to engage the solenoid when the voltage on the capacitor 62 is sufficiently charged, which is when the FET 64 is shunting current from the diode 60 and the capacitor 62.

The lockout circuit 52 receives the control voltage from the output of the amplifier 66, via resistors 78 and 82. Resistors 82 and 84 are arranged to provide a voltage division of the control signal so as to properly bias the base of a transistor 86, which in turn activates another transistor 88, via bias resistors 90 and 92, thereby permitting the trip signal ("TS") from the trip level comparator 50 to latch an SCR 54 using the energy from the capacitor 62 to cause the coil 30 to actuate the solenoid plunger mechanism (not shown). A capacitor 98 is used between the gate of the SCR 54 and common so that electrical noise will not cause false trip activations.

Accordingly, the operational amplifier 66 is arranged to maintain direct control over both the FET 64 and the lockout circuit 52 which is in parallel with the FET 64. As with many conventional self-powered current monitoring arrangements, the current transformers have to be adequately sized so that the minimum current and voltage levels provided thereby are greater than the levels required to charge the capacitor 62 to the necessary operating level. Unlike such conventional arrangements, however, the FET 64 and the lockout circuit 52 are arranged in parallel, so that the minimum charge on the capacitor 62 does not have to exceed the maximum operating level required for the circuit which determines the conditions for permitting actuation of the solenoid. The tolerance requirement is that the voltage on the capacitor 62 must be sufficiently large to operate the operational amplifier 66 and sufficiently large to operate the solenoid.

Figure 5:
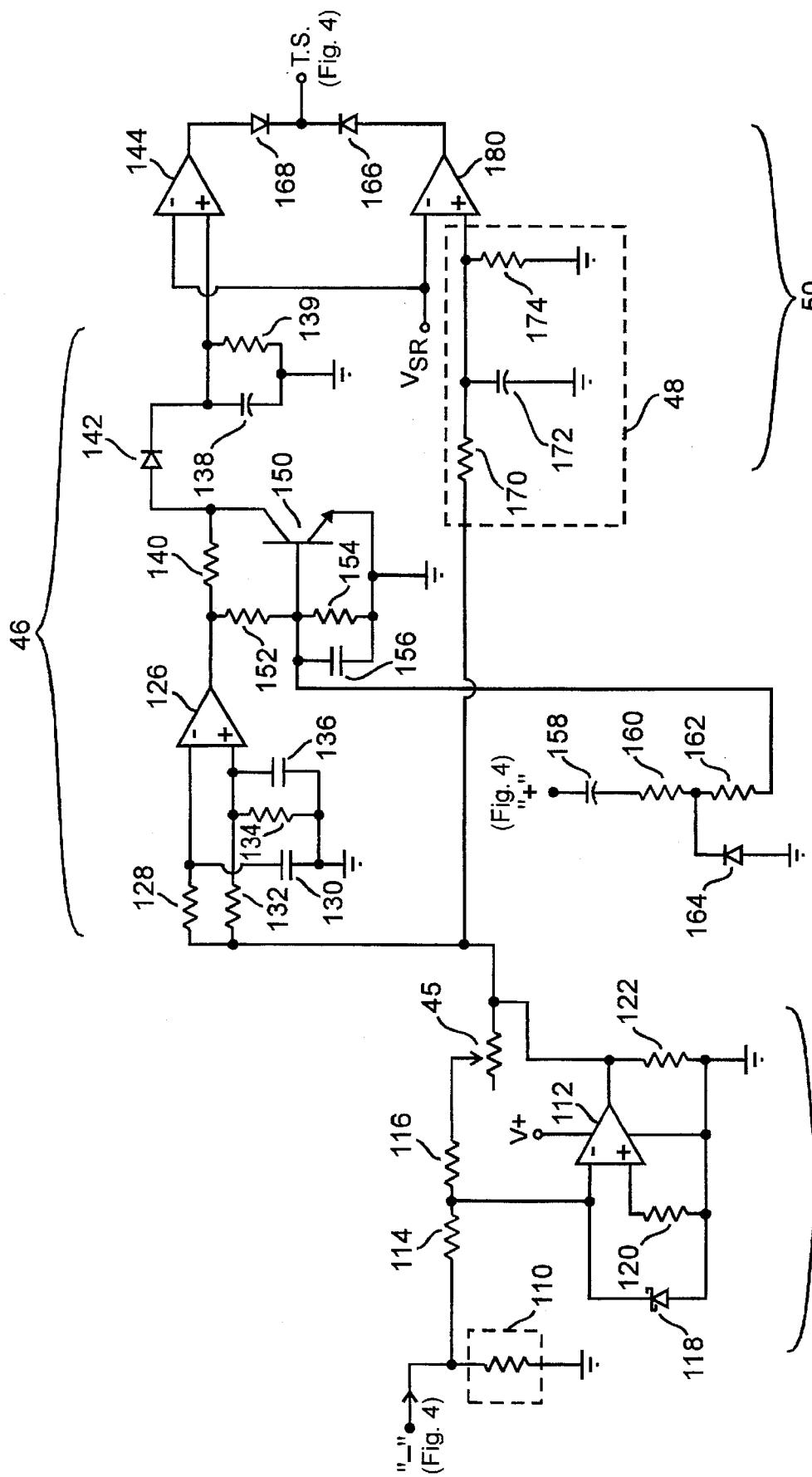
FIG. 5 is an electrical schematic diagram of another part of the block diagram of FIG. 3 pertaining to analysis of the current in the three-phase circuit path.

FIG. 5 illustrates in more detail the scaling amplifier 44, the FLA adjustment potentiometer 45, the phase-loss/overload detector 46 and 48, and the trip level comparator 50 of FIG. 3. The scaling amplifier 44 and the FLA adjustment potentiometer 45 are arranged in a conventional manner, using a burden resistor 110 to convert the induced current being returned to the rectifiers to a voltage signal and using an operational amplifier 112 to provide the set point for the current trip level.

A pair of resistors 114 and 116 and potentiometer 45 scale the output of the operational amplifier 112 so that 1.5 volts is produced at its output when 112% of the FLA dial setting is flowing through each phase of the load. A Schottky diode 118 protects the input of the operational amplifier 112 from going more negative than 0.4 v below common to prevent the output of the operational amplifier 112 from becoming unstable. A resistor 120 provides input bias current cancellation, and a resistor 122 provides the necessary reference to common, permitting the output of the operational amplifier 112 to drive the phase-loss/overload detector 46 and 48 at the properly scaled voltage level.

The phase-loss/overload detector 46 and 48 includes a phase-loss detector 46 which is substantially independent from an R-C integration circuit 48.

The phase-loss detector 46 includes an operational amplifier 126 arranged to detect when the instantaneous voltage provided at the output of the operational amplifier 112 is greater than one-half the average voltage. A resistor 128 and a capacitor 130 are arranged as a low-pass filter at the negative terminal input of the operational amplifier 126 to indicate the instantaneous voltage, and resistors 132 and 134 and a capacitor 136 function as a voltage divider and integrator to provide one-half the average voltage at the positive terminal input of the operational amplifier 126.

Under normal phase loss conditions, the instantaneous voltage drops below half the average for a period of around 1 to 2 milli-seconds each half cycle, and therefore the output of the operational amplifier 126 will be a train of pulses which will be sufficient to change capacitor 138 after 2–3 seconds, of the phase loss condition persisting. If the instantaneous voltage is less than or equal to one-half the average voltage for period of time which is sufficient to charge a capacitor 138 through a resistor 140 and a blocking diode 142, and the voltage at the output of the operational amplifier 126 exceeds the stable reference voltage Vsr at the input of a comparator 144, then the overload relay determines that a phase loss is present and the operational amplifier 126 sends a high-level signal to the comparator 144 to trip the trip level comparator 50. A resistor 139 at the positive terminal input of the operational amplifier 144 provides sufficient discharge of the capacitor 138 to prevent an accumulation of false phase-loss signals from nuisance tripping the solenoid.

For additional information concerning this phase-loss detection technique and the related circuitry, reference may be made to U.S. Pat. No. 4,823,226, entitled "Phase Loss Protection Circuit Including Transient Protection," assigned to the instant assignee and incorporated herein by reference.

Located between the operational amplifier 126 and the trip level comparator 50 is a tripping-validation circuit centered around a bipolar transistor 150. The transistor 150 prevents the output of the operational amplifier 126 from engaging the comparator 144 in response to a nuisance condition, discovered as a part of the present invention, resulting from the delay required for the capacitor 136 to discharge through resistors 132 and 134. After the output of the operational amplifier 126 goes high, the width of the output pulse from the operation amplifier 126 is limited to that which represents a true phase loss condition, so as not to charge the capacitor 138 when power is normally removed from the load. Otherwise, the charge on the capacitor 136 may cause a nuisance trip of the solenoid. For this reason, the transistor 150 is controlled by resistors 152, 154 and 156 such that the transistor is biased "on" to prevent further charge of the capacitor 138 after a period of time which is adequate to indicate when the instantaneous voltage provided at the output of the operational amplifier 112 is greater than one-half the average voltage.

Another problem recognized and overcome in connection with the present invention concerns a potential nuisance trip as a result of the FET (64 of FIG. 4) switching "off" and no longer shunting the current away from the power supply capacitor (62 of FIG. 4). Because the current transformers are not ideal, when the FET is on, the current transformers see less power supply burden and, consequently, they produce more current. When the FET is suddenly turned off in this mode, the current output from the current transformers drops. Under certain low-current conditions on the overload relay where low currents are produced from the current transformers, the current transformers can error to such an extent that the rectified signal ("+") can actually drop below half the average as stored in the capacitor 36 until such time as the half average value can drop to reflect the new half average. In such situations, there is a potential of confusing the overload relay into assuming that a phase loss has occurred when, in reality, the FET has merely turned off and the burden on the current transformers has increased.

To overcome this potential confusion, a capacitor 158 is arranged in series with resistors 160 and 162 to control the base of the transistor 150 such that after the FET is switched off the averaging function in the phase loss detector is given an adequate period of time to recover. Acting as a high-pass filter, the capacitor 158 passes the transient voltage signal resulting from when the FET is switching off and the capacitor 156 begins to charge through resistors 160 and 162. This turns on transistor 150 and prohibits amplifier 126 from charging capacitor 138 through resistors 140 and 142.

A diode 164 clamps the junction between the resistors 160 and 162 to 0.7 below common (or ground) to protect the transistor 150 from having reverse voltage applied to its base-emitter junction. When the FET turns on, the voltage at the drain of the FET is essentially at common. That would place a negative voltage across 162 and 164 and consequently into the base of the transistor 150. The diode 164 therefore clamps that point to protect under this condition.

The R-C integration circuit 48 includes a resistor 170 and a capacitor 172 which provides a signal integration (or delay timer) to indicate when an overload is present. At the other side of the R-C integration circuit 48, a resistor 174 permits the capacitor 172 to discharge such that the output of an operational amplifier 180 indicates when the voltage on the capacitor 172 exceeds the stable reference voltage Vsr.

Diodes 166 and 168 are interconnected to permit the output of either the comparator 144 or the comparator 180 to send a trip signal in response to a phase-loss detection or an overload detection, respectively.

In an exemplary embodiment, the present invention can be implemented using the circuit of FIG. 5 with the following component values:

| | |
|---|---|
| resistor 45: 100 kΩ Potentiometer | capacitor 62: 470 µF |
| resistor 68: 137 kΩ | capacitor 98: 0.47 µF |
| resistor 72: 845 kΩ | capacitor 130: 0.01 µF |
| resistor 74: 100 kΩ | capacitor 136: 1 µF |
| resistor 76: 10 MΩ | capacitor 138: 4.7 µF |
| resistor 78: 48.7 kΩ | capacitor 156: 1 µF |
| resistor 82: 118 kΩ | capacitor 158: 0.33 µF |
| resistor 89: 100 kΩ | capacitor 172: 220 µF |
| resistor 90: 34.8 kΩ | resistor 110: 113 Ω |
| resistor 92: 20 kΩ | resistor 114: 16.2 kΩ |
| resistor 94: 6.81 kΩ | resistor 116: 23.7 kΩ |
| resistor 96: 1 kΩ | resistor 120: 10 kΩ |
| resistor 122: 30.1 kΩ | resistor 154: 20 kΩ |
| resistor 127: 221 kΩ | resistor 160: 10 kΩ |
| resistor 132: 221 kΩ | resistor 162: 46.4 kΩ |
| resistor 134: 221 kΩ | resistor 170: 432 kΩ |
| resistor 139: 2.4 MΩ | resistor 174: 2.4 MΩ |
| resistor 152: 162 kΩ | resistor 140: 309 kΩ |

Accordingly, a circuit interruption system has been disclosed, embodying the principles of the present invention and providing high-end performance in terms of current transformer selectivity and accuracy in detecting fault conditions.

Those skilled in the art will readily recognize that various modifications and changes may be made to the present invention without departing from the true spirit and scope thereof, which is set forth in the following claims.

What is claimed is:

1. A circuit interrupter arrangement for interrupting current in a circuit path, comprising:
   a current inducer circuit for inducing a current signal having a magnitude corresponding to the current in the circuit path;
   an energy accumulator for accumulating a magnitude of energy sufficient to cause interruption of the circuit path;
   an energy accumulator control circuit controlling the magnitude of energy accumulating;
   a trip lock-out circuit, responsive to an insufficient magnitude of accumulating energy, for preventing an interruption of the circuit path; and
   a range control circuit, responsive to the current inducer circuit, for operating a power-related signal between a HIGH level and a LOW level to control the energy accumulator control circuit and the trip lock-out circuit.

2. A circuit interrupter arrangement, according to claim 1, wherein the energy accumulator control circuit and the trip lock out circuit are arranged in parallel with respect to the range control circuit.

3. A circuit interrupter arrangement, according to claim 1, wherein the power-related signal is used to control the energy accumulator control circuit and the trip lockout circuit.

4. A circuit interrupter arrangement, according to claim 3, wherein the energy accumulator includes a capacitor and the magnitude of energy accumulated therein is a predetermined voltage level.

5. A circuit interrupter arrangement, according to claim 1, wherein the energy accumulator includes a capacitor and the magnitude of energy accumulated therein is a predetermined voltage level.

6. A circuit interrupter arrangement, according to claim 1, wherein the energy accumulator control circuit includes a switch.

7. A circuit interrupter arrangement, according to claim 6, wherein the switch includes a transistor controlled in one mode so that the energy accumulates and controlled in another mode so that the energy does not accumulate.

8. A circuit interrupter arrangement, according to claim 1, further including a phase-loss detection circuit responsive to one-half of an average voltage, corresponding to an output of the current inducer circuit, exceeding an instantaneous voltage corresponding to the output of the current inducer circuit.

9. A circuit interrupter arrangement for interrupting current in a circuit path, comprising:
   a current inducer circuit for providing current corresponding to the current in the circuit;
   a hysteresis circuit, responsive to the current inducer circuit, for developing a control signal;
   a power control circuit, responsive to the hysteresis circuit control signal, for developing a voltage signal from the current provided by the current inducer circuit, the voltage signal operating between a first power related level and a second power related level;
   a power accumulator, responsive to the power control circuit, for accumulating a voltage sufficient to cause an interruption of the circuit; and
   a trip lock-out circuit, responsive to the hysteresis circuit, actuated to prevent an interruption of the circuit.

10. A circuit interrupter arrangement, according to claim 9, wherein the hysteresis circuit includes an operational amplifier including a feedback circuit between an input terminal and an output terminal of the operational amplifier.

11. A circuit interrupter arrangement, according to claim 9, wherein the hysteresis circuit is powered from the same operating voltage as the voltage on the power accumulator.

12. A circuit interrupter arrangement, according to claim 9, wherein the hysteresis circuit is biased by a stable reference voltage.

13. A circuit interrupter arrangement, according to claim 9, further including a phase loss detector for sending a command signal to actuate interruption of the circuit path.

14. A circuit interrupter arrangement, according to claim 9, further including an overload detector for sending a command signal to actuate interruption of the circuit path.

15. A circuit interrupter arrangement for interrupting current in a circuit path, comprising:
   a plurality of current transformers providing current corresponding to the current in the circuit;
   a hysteresis circuit, responsive to the current inducer circuit, for developing a control signal;
   a switch, responsive to the hysteresis circuit control signal, for developing a voltage signal from the current provided by the current inducer circuit, the voltage signal operating between a first power related level and a second power related level;
   a capacitor, responsive to the switch, for accumulating power to generate sufficient power to cause an interruption of the circuit;
   a phase-loss detection circuit;
   an overload detection circuit;
   a solenoid, responsive to the phase-loss detection circuit and the overload detection circuit, for causing an interruption of the circuit path; and
   a trip lock-out circuit, responsive to the hysteresis circuit, actuated to prevent actuation of the solenoid and interruption of the circuit path.

16. A circuit interrupter arrangement, according to claim 15, further including a circuit providing a stable reference voltage.

17. A circuit interrupter arrangement, according to claim 16, wherein the hysteresis circuit is biased by the stable reference voltage.

18. A circuit interrupter arrangement, according to claim 17, further including a trip level comparison circuit responsive to the circuit providing a stable reference voltage.

19. A circuit interrupter arrangement, according to claim 18, wherein the trip level comparison circuit commands an interruption of the circuit path in response to the phase-loss detection circuit and the overload detection circuit.

20. A circuit interrupter arrangement, according to claim 15, wherein the switch is a FET.

21. A circuit interrupter arrangement, according to claim 1, wherein the trip lock-out circuit and the energy accumulator control circuit share a common comparator.

* * * * *